UNITED STATES PATENT OFFICE.

KARL FARKAS, OF NEW YORK, N. Y., ASSIGNOR OF ONE-HALF TO GUY V. WILLIAMS, OF NEW YORK, N. Y.

CEMENT FOR METALLIC FILAMENTS.

1,044,156.     Specification of Letters Patent.     Patented Nov. 12, 1912.

No Drawing.     Application filed August 11, 1909. Serial No. 512,279.

*To all whom it may concern:*

Be it known that I, KARL FARKAS, a citizen of the Kingdom of Hungary, and a resident of New York, in the county and State of New York, have invented certain new and useful Improvements in Cement for Metallic Filaments, of which the following is a specification.

This invention has reference to improvements in cement for metallic filaments by means of which same are secured or cemented to the inner ends of the conducting or leading-in wires of the incandescent electric lamp.

It is the special object of my invention to produce a novel cement by means of which the breaking off of the filaments near the cemented portion is reduced to a minimum. This cement is prepared essentially from inorganic, mineral substance and some metal powder and a suitable binding material. Accordingly this cement produces a perfect metallic connection between the metallic filament and the ends of the leading-in wires. When the cementing is finished such metallic connection does not give off any gases neither can it absorb same. Thus the vacuum in the lamp is retained at its normal height and can not be impaired even if such metallic connection would be heated to a higher than the normal temperature usually produced therein during the operation of the lamp. The principal component of the novel cement is an oxid in its lower valency of the elementary substance of which the metallic filament itself is composed. During the process of manufacture such lower oxid is reduced and therefore a metallic connection is formed between the filament and the leading-in wires. This connection, however, is sufficiently large in comparison to the diameter of the filament to offer but little resistance to the electric current and therefore is not heated to an appreciable extent.

In carrying the invention into effect I substantially proceed as follows: Assuming that tungsten filaments are to be cemented then the cement is prepared from tungstous oxid to which a small percentage of metallic aluminum is added. Both are mixed thoroughly and rubbed into some thinned tar or other suitable binding material as for instance a solution of sodium silicate.

The tungstous oxid is prepared preferably in the following manner: Tungstic anhydrid $WO_3$ or tungstic acid $WO(OH)_4$ or the acid $WO_2(OH)_2$ or the acid $W_2O_5(OH)_2$ are brought into contact with zinc and diluted hydrochloric acid. By this reduction the solution first becomes blue by the formation of tungsten pentoxid $W_2O_5$, then it becomes brown by the formation of oxids of lower valency like the dioxid $WO_2$. This compound is washed and dried and passed through fine silk sieves. When thus prepared some metallic aluminum powder is mixed therewith, a quantity of from 2 to 3% is sufficient. This mixture is then rubbed into thinned tar or sodium silicate solution until a paste or cement of proper consistency has been obtained. The cement thus prepared is now applied. The filaments together with the connecting cement portions are dried in a stove and then the cemented portion alone is electrically heated in an atmosphere of hydrogen whereby the tungstous oxid is reduced to elementary tungsten. Now the stem with filament is inserted into the lamp globe and the lamp finished in the usual manner. During the process of exhaustion no gases will be given off by this perfect metallic connection because such metallic connection can not absorb any gases as is the case with graphite cement for carbon lamps.

By the employment of this novel metallic cement the breakage of the filaments near the cement is reduced to a minimum whereby a great saving is effected.

I claim as my invention:

1. As a new article of manufacture, a cement for metallic filament consisting of oxids of a low valency of a highly refractory elementary substance in form of fine powder, a small quantity of metallic aluminum powder, and sufficient liquid binder to impart the proper consistency.

2. As a new article of manufacture, a cement for metallic filaments composed of fine powder of oxids of a low valency of the highly refractory metal of which the filament is made, a small quantity of metallic aluminum powder, and sufficient liquid binder to impart the proper consistency.

3. As a new article of manufacture, a cement for tungsten filaments composed of tungstous oxids in form of fine powder, a small quantity of aluminum powder, and sufficient liquid binder to impart the proper consistency.

4. As a new article of manufacture, a cement for tungsten filaments composed of tungstous oxids in form of fine powder, from 2 to 3 per cent. of metallic aluminum powder, and sufficient liquid binder to impart the proper consistency.

5. As a new article of manufacture, a cement for tungsten filaments composed of tungstous oxids in form of fine powder, from 2 to 3 per cent. of metallic aluminum powder, and sufficient solution of sodium silicate to impart the proper consistency.

Signed at New York, N. Y., this 10th day of August, 1909.

KARL FARKAS.

Witnesses:
LUDWIG K. BOHM,
GUY V. WILLIAMS.

Copies of this patent may be obtained for five cents each, by addressing the "Commissioner of Patents, Washington, D. C."